United States Patent
Changlani et al.

(10) Patent No.: US 11,683,819 B2
(45) Date of Patent: Jun. 20, 2023

(54) DYNAMIC CONFIGURATION OF MULTIPLE RADIOS OF AN ACCESS POINT

(71) Applicant: Hewlett Packard Enterprise Development LP, Houston, TX (US)

(72) Inventors: Nitin Changlani, Milpitas, CA (US); Farhan Hasnain, Newark, CA (US); Mohd Shahnawaz Siraj, San Jose, CA (US); Manoj Thawani, San Jose, CA (US); Deven Patel, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/890,195

(22) Filed: Jun. 2, 2020

(65) Prior Publication Data
US 2021/0377947 A1 Dec. 2, 2021

(51) Int. Cl.
| | |
|---|---|
| *H04W 72/04* | (2023.01) |
| *H04L 5/10* | (2006.01) |
| *H04W 88/08* | (2009.01) |
| *H04L 5/00* | (2006.01) |
| *H04W 72/12* | (2023.01) |
| *H04W 48/16* | (2009.01) |
| *H04L 41/0803* | (2022.01) |
| *H04W 72/53* | (2023.01) |
| *H04W 72/0453* | (2023.01) |

(52) U.S. Cl.
CPC ............. *H04W 72/53* (2023.01); *H04L 5/001* (2013.01); *H04L 5/0062* (2013.01); *H04L 5/10* (2013.01); *H04L 41/0803* (2013.01); *H04W 48/16* (2013.01); *H04W 72/0453* (2013.01); *H04W 72/1215* (2013.01); *H04W 88/08* (2013.01)

(58) Field of Classification Search
CPC ......... H04W 72/0493; H04W 72/0453; H04W 88/08; H04W 72/082; H04L 5/10
See application file for complete search history.

(56) References Cited

U.S. PATENT DOCUMENTS

| | | | | |
|---|---|---|---|---|
| 2013/0203435 A1* | 8/2013 | Smith | .................... | H04W 16/14 455/454 |
| 2014/0369271 A1* | 12/2014 | Amini | .................... | H04W 24/02 370/329 |
| 2015/0098377 A1* | 4/2015 | Amini | .................... | H04W 36/06 370/311 |

(Continued)

*Primary Examiner* — Jay L Vogel
(74) *Attorney, Agent, or Firm* — Jaffery Watson Mendonsa & Hamilton

(57) ABSTRACT

Dynamic configuration of multiple radios of an access point is described. An example of an access point includes a processor; a memory; hardware filters; and a first set of radio chains and antennas, the access point including a first radio mode for operation as a single radio on a first channel to service a first BSS and a second radio mode for operation as a first radio on the first channel and a second radio on a second channel to perform an additional service, wherein the access point is to provide dynamic configuration of the radios including, upon determining that operation of the first channel to service the first BSS is not compatible with a particular hardware filter of the first radio, migrating the first BSS from the first radio to the second radio to service on the second channel, and providing the additional service on the first channel.

8 Claims, 12 Drawing Sheets

(56) References Cited

U.S. PATENT DOCUMENTS

| | | | |
|---|---|---|---|
| 2015/0156645 A1* | 6/2015 | Ponnuswamy | H04W 48/16 370/241 |
| 2016/0073405 A1* | 3/2016 | Khawer | H04L 5/0007 370/329 |
| 2016/0381558 A1* | 12/2016 | Caulfield | H04W 16/14 726/1 |
| 2017/0034832 A1* | 2/2017 | Karimli | H04W 72/082 |
| 2018/0092029 A1* | 3/2018 | Canpolat | H04W 24/02 |
| 2019/0082497 A1* | 3/2019 | Friedmann | H04W 88/10 |

\* cited by examiner

PRIMARY AND SECONDARY RADIO OPERATION

MULTIPLE RADIO ADAPTATION CASES FOR ACCESS POINT OPERATIONS

Case 1:
Primary Radio: Lower Sub-Band – Secondary Radio: Upper Sub-Band
Condition:
Simultaneous TX and/or RX on Both Channels
Mitigation Operation:
None Required
— 410

Case 2:
Primary Radio: Upper Sub-Band – Secondary Radio: Lower Sub-Band
Condition:
RX on Each Radio Affected by TX on Other Radio
Mitigation Operation:
BSS Migration Between Primary and Secondary Radios
— 420

Case 3:
Primary Radio: Lower Sub-Band – Secondary Radio: Lower Sub-Band
Condition:
RX on Each Radio Affected by TX on Other Radio
Mitigation Operation:
Use For Scanning – Increase Dwell Time
— 430

Case 4:
Primary Radio: Upper Sub-Band – Secondary Radio: Upper Sub-Band
Condition:
RX on Each Radio Affected by TX on Other Radio
Mitigation Operation:
BSS Migration Between Primary and Secondary Radios
Use For Scanning – Increase Dwell Time
— 440

FIG. 4

PRIMARY AND SECONDARY RADIO FILTERING CASES
CASE 1
Primary Radio 510 (Channel 36)
Secondary Radio 515 (Channel 149)
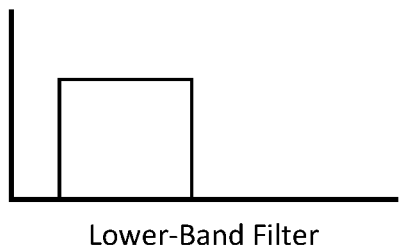
Lower-Band Filter
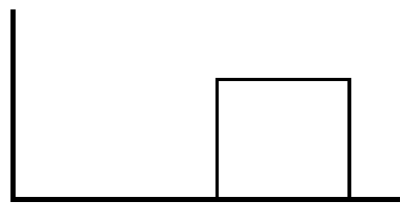
Upper-Band Filter
*FIG. 5A*
CASE 2
Primary Radio 640 (Channel 36)
Secondary Radio 645 (Channel 149)
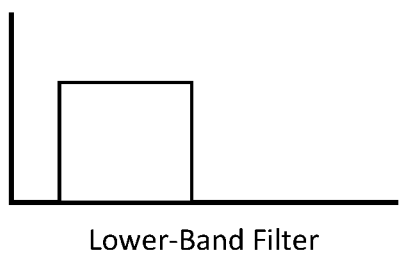
Lower-Band Filter
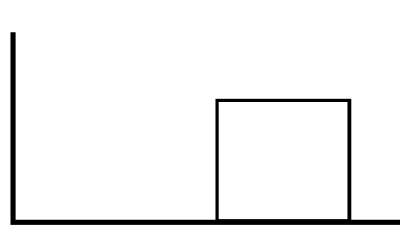
Upper-Band Filter
*FIG. 5B*

PRIMARY AND SECONDARY RADIO FILTERING CASES

ACCESS POINT WITH DYNAMIC CONFIGURATION OF
MULTIPLE RADIOS
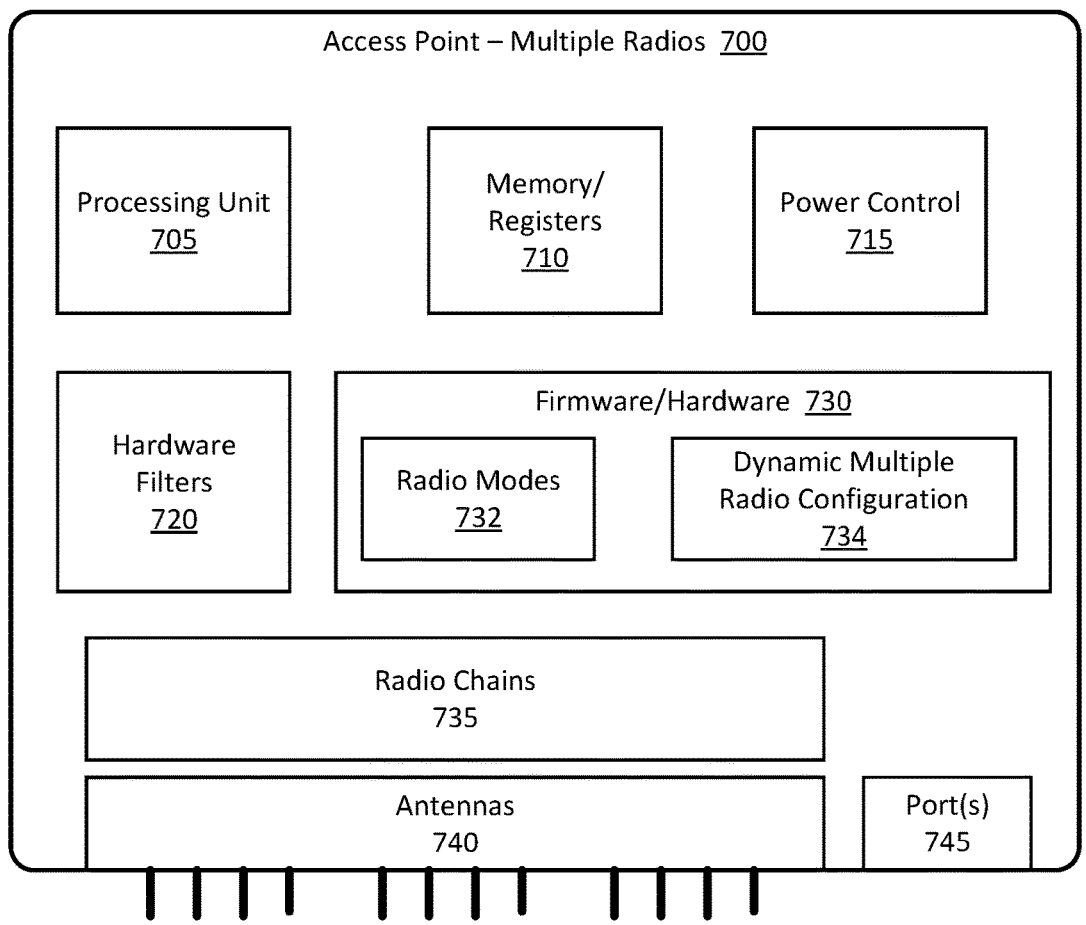
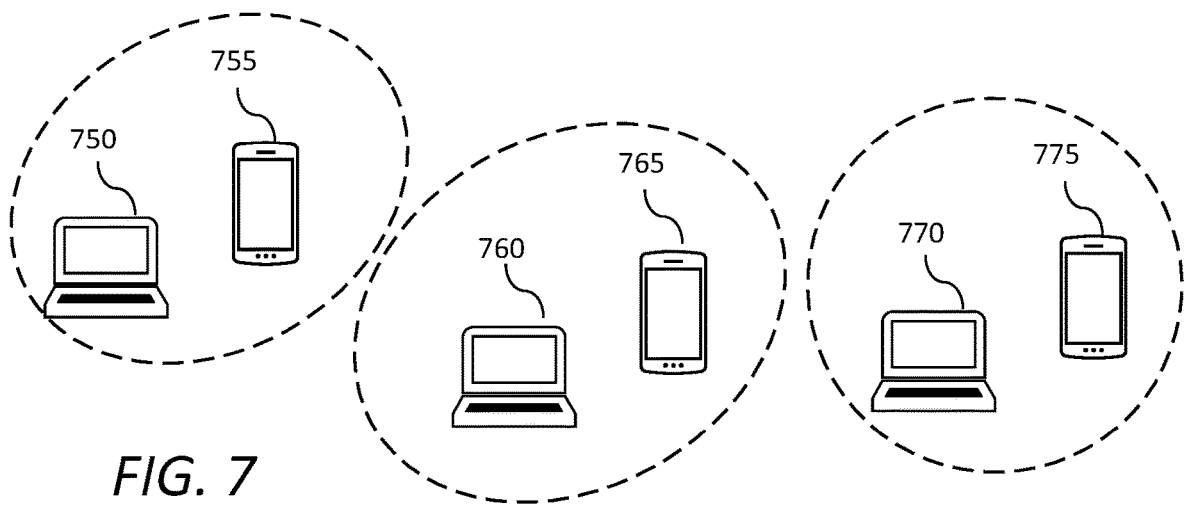
FIG. 7

INTELLIGENT CHANNEL ALLOCATION FOR ACCESS POINTS
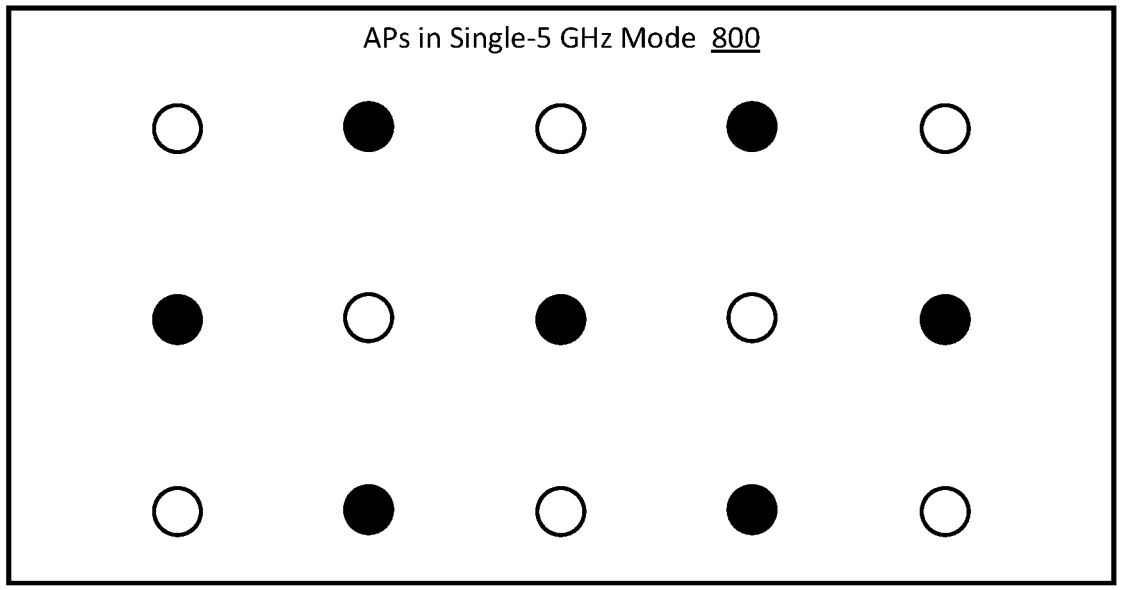
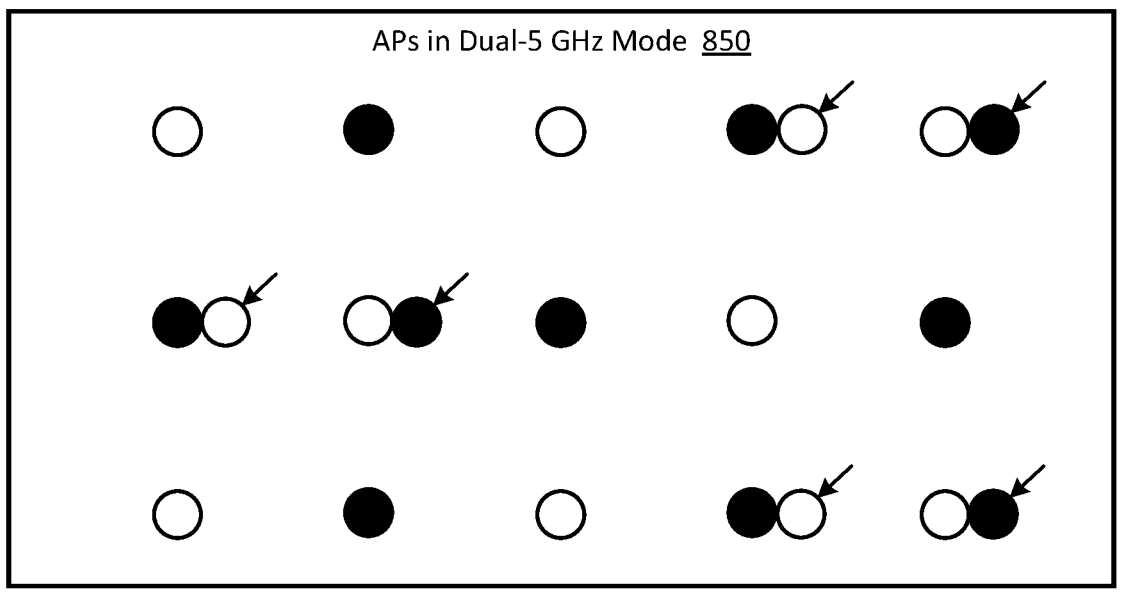
FIG. 8

DYNAMIC CONFIGURATION OF MULTIPLE RADIOS OF AN ACCESS POINT

BACKGROUND

Wireless access points may include multiple radios for serving stations, such as client devices, in multiple different frequency bands. In a particular example, a Wi-Fi access point may include a first radio operating with a first set of radio chains in the 2.4 GHz frequency band and a second radio operating with a second set of radio chains in the 5 GHz frequency band, thus allowing for servicing of multiple operations at a same time.

In certain access points, there may further be an architecture that allows for splitting the antennas and radio chains of a radio into multiple independent radios operating within the same band. Specifically, a Wi-Fi access point operating in the 5 GHz frequency band may be capable of splitting the antennas and radio chains into two radios operating in the 5 GHz frequency band on different channels.

While multiple radio capability enables the addition of another function that can be provided by the access point in operation, the multiple radios of an access point in a frequency band can interfere with each other, with transmission of one radio interfering with reception at the other. The interference can be addressed with the application of sufficient hardware filtering. However, hardware filters are relatively expensive and large in size (especially for concurrent operation within a same band), and thus manufacturers would prefer to minimize the filters that are provided in an enterprise access point and limit select filters to certain radios.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 is an illustration of multiple radio adaptation cases for access point operations, according to some embodiments;

FIGS. 5A to 5D are illustrations of signal operations for radio adaptation cases, according to some embodiments;

FIG. 7 is an illustration of an access point including dynamic configuration of multiple radios, according to some embodiments; and FIG. 8 is an illustration of intelligent channel allocation for access points, according to some embodiments.

DETAILED DESCRIPTION

Figure 1:
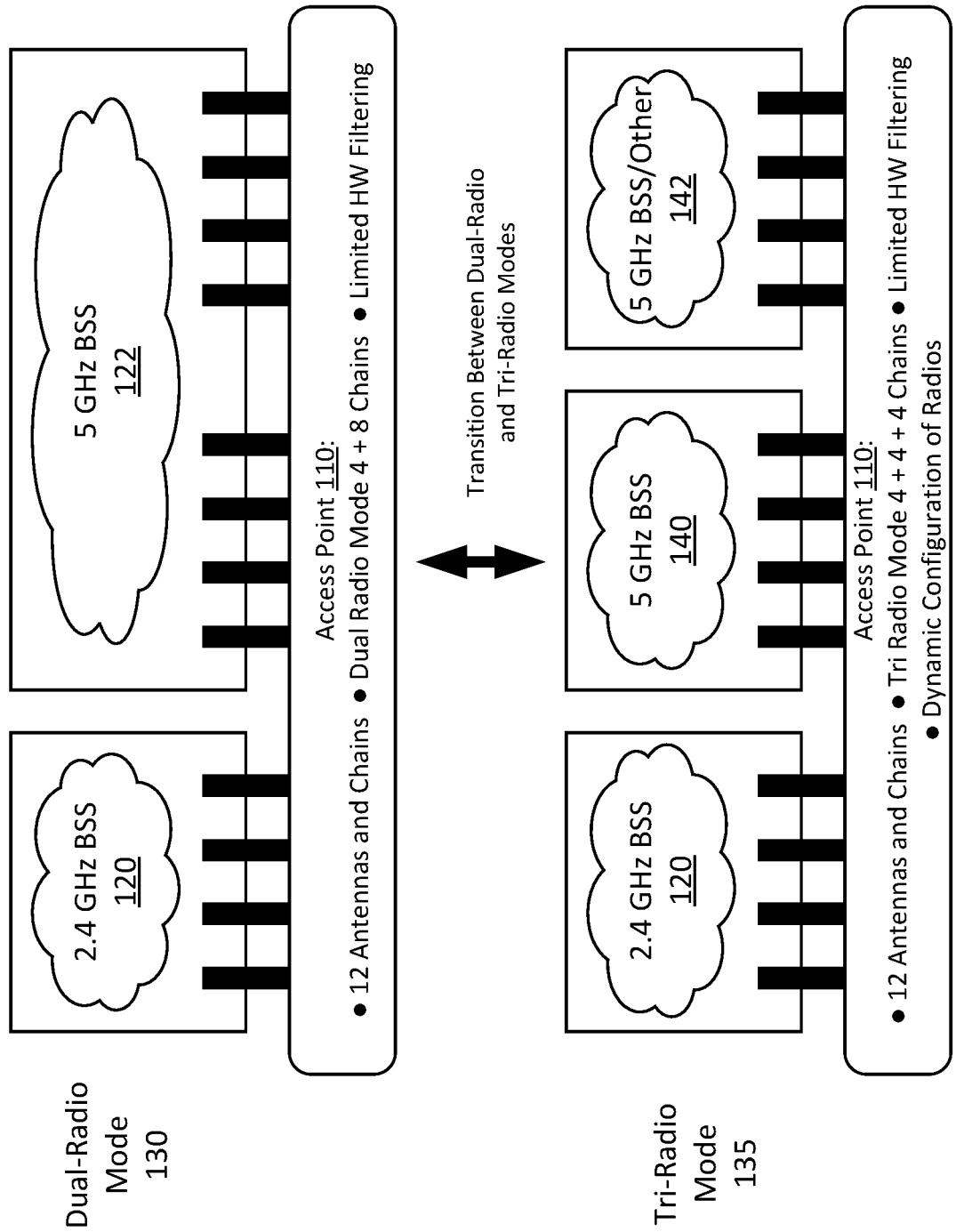
FIG. 1 is an illustration of an access point including dual-radio and tri-radio modes, according to some embodiments.

Embodiments described herein are directed to dynamic configuration of multiple radios of an access point.

An access point (AP) may be operable to split a radio operating in a frequency band into two radios in the same frequency band on different channels. In particular, an AP may include a first set of radio chains for 2.4 GHz (Gigahertz) operation (such as 4 antennas) and a second set of radio chains for 5 GHz (such as 8 antennas) in a dual-radio mode (dual-radio referring to a first radio in 2.4 GHz operation and a second radio in 5 GHz operation). It is noted that the 5 GHz operation may be referred to as a single-5 GHz mode.

The access point may further have the capability of reconfiguring the radio chains of the 5 GHz operation from into two 5 GHz radios, which may be referred to as a primary radio and a secondary radio. This operation may be also referred herein as a tri-radio mode (tri-radio referring to a first radio in 2.4 GHz operation, a second radio in 5 GHz operation, and a third radio in 5 GHz operation). (With regard to 5 GHz operation, this may be referred to as a transition between a single 5 GHz mode to a dual 5 GHz mode.) In future radio standards the multiple radios of an AP may also or alternatively include channels in other frequency bands, such as 6 GHz operation. For example, a frequency band may encompass 5 and 6 GHz frequency bands (UNII (Unlicensed National Information Infrastructure)-1 to UNII-8) treated as a contiguous band with the second frequency band being the 2.4 GHz frequency band, wherein frequency sub-bands in the larger contiguous 5 to 7 GHz frequency range (UNII-1 to UNII-8) may be divided into any number of non-overlapping sections with filtering appropriate to each sub-band.

It is noted that the discussion herein also applies to an access point that only services a single frequency band, such as a 5 GHz access point that may switch between a single-radio mode (a single radio in 5 GHz operation) to a dual-mode (a first (primary) radio in 5 GHz operation and a second (secondary) radio in 5 GHz operation).

In a particular example operation, a 5 GHz radio of an AP in dual-radio mode may service a particular basic service set (BSS), the BSS including the AP and a set of one or more stations, such as client device. In a tri-radio mode, one of the radios would continue to serve the BSS, and the other radio may serve another function, such as serving another BSS or performing scanning, depending on the need and circumstance.

However, the primary and secondary radios can interfere with each other, with transmission of one radio interfering with reception at the other, requiring filtering. While this interference may be addressed with sufficient filtering, such as providing a full set of selectable hardware filters (i.e., a full-band filter, an upper-band filter, and a lower-band filter) for each radio, this may not be practical in terms of cost and physical size in an enterprise access point. To reduce cost and physical size, the 5 GHz radios of an access point may have limited hardware filters. Specifically, the primary radio chains may have a lower-band filter and a full-band filter (without an upper-band filter), and the secondary radio chains have an upper-band filter and a full-band filter (without a lower-band filter), and thus available filters may not be compatible with certain channel assignments. While this particular filter arrangement is described and illustrated herein, other limited filter combinations and arrangements are also possible in AP implementations.

In some embodiments, an apparatus, system, or process includes capability to reconfigure the radios and filters of an access point having limited hardware filtering to overcome limitations and improve performance. In the particular implementation of an access point including primary radio chains having a lower-band filter and a full-band filter and secondary radio chains having an upper-band filter and a full-band filter, a preferred case or arrangement is for the primary radio to be on a lower sub-band channel of the frequency band and the secondary radio to be on an upper sub-band channel of the frequency band, allowing use of the lower-band and upper-band filters in the radio chains, without requiring use of full-band filtering. (For example, the 5 GHz band for Wi-Fi operation in the United States includes channels 36, 40, 44, and 48 in a lower sub-band and channels 149, 153, 157, 161, and 165 in an upper sub-band. Other channels also exist for certain operations, such as DFS (Dynamic Frequency) channels in frequencies that are also utilized for radar.).

However, in particular circumstances, such as operations in which overlapping BSSs (OBSSs) are currently utilizing certain channels, the radios in an access point may be assigned channels in reversed sub-bands, or may be assigned channels within the same sub-band. The reversed or same sub-bands may require use of full-band filtering on either or both of the radios, thus reducing reception performance.

In some embodiments, implementations may further include use of intelligent placement of APs in dual mode to provide uniform distribution of upper and lower bands to promote isolation of primary and secondary channels. In some embodiments, implementations may further include splitting scanning of upper and lower sub-bands between co-located APs to further improve radio operation.

As used herein, access point (AP) (also referred to as a wireless access point (WAP)) refers to a networking hardware device that allows wireless devices to connect to a network, including connection to the Internet or an intranet. The AP may connect to a router (via a wired network) as a standalone device, or may be an integral component of the router itself. An AP may include, but is not limited to, communication using any IEEE 802.11 Wi-Fi standards.

FIG. 1 is an illustration of an access point including dual-radio and tri-radio modes, according to some embodiments. As illustrated in FIG. 1, an example of an access point 110 includes 12 antennas and radio chains, the access point 110 being configurable to operate in either a dual-radio mode 130 or a tri-radio mode 135. In the dual-radio mode 130, the radio chains are configured in 4 radio chains for a first radio 120 operating at 2.4 GHz, wherein the first radio 120 may include operations to service a first BSS, and 8 radio chains for a second radio 122 at 5 GHz, wherein the second radio may include operations to service a second BSS. The operations of the radios are not limited to servicing of different BSSs, but the separate radio bands allows for operation with minimal interference between the radios, and thus provide good capability for such use.

Upon transitioning from the dual-radio mode 130 to the tri-radio mode 135, the radio chains are configured in 4 radio chains for the first radio 120 operating at 2.4 GHz, 4 radio chains for a second radio 140 (which may be referred to as a primary radio) at 5 GHz, wherein the second radio 140 may include operations to service the second BSS, and 4 radio chains for a third radio 142 (which may be referred to as a secondary radio) at 5 GHz, wherein the third radio 142 may include operations to service a third BSS or perform another function, such as scanning of channels in the frequency band.

However, the operations in the tri-radio mode 135 are complicated by the operation of the second radio 140 and third radio 142 in the 5 GHz band, thus creating risk of the interference in the radio reception of one radio caused by the radio transmissions of the other radio. Further, the access point 110 includes limited selectable hardware filtering, thus restricting the options for filtering depending on the particular 5 GHz sub-band and channel on which each radio is operating. In the particular implementation of the primary radio chains having available a lower-band filter and a full-band filter and the secondary radio chains having available an upper-band filter and a full-band filter, the preferred case or arrangement is for the primary radio to be on a lower sub-band channel of the frequency band and the secondary radio to be on an upper sub-band channel of the frequency band, allowing use of the lower-band and upper-band filters in the radio chains as a complementary filter set (protected from each other), without requiring use of full-band filtering (protected from radio in other bands, 120, but not between each other). However, this particular assignment of channels may not be available for the radios of the access point 110.

In some embodiments, the access point 110 includes capability for dynamic configuration of the radios of the access point to provide improved radio operation with two radios within a frequency band, depending on the channel and frequency sub-band for each radio. More specifically, the access point 110 may provide for the following:

(1) For the primary radio on an upper sub-band channel and the secondary radio on a lower sub-band channel: Migrating the BSS from the primary radio to the secondary radio (moving data structures, re-setting channels, and re-routing frames) to re-configure the operation as the preferred case, allowing use of the lower-band filter mode for the primary radio and upper-band filter for the secondary radio.

(2) For primary and secondary radios on channels in the lower sub-band: Enabling lower-band filter mode for the primary radio chains and full-band filter mode for the secondary radio chains. Further, increasing dwell time for the secondary radio to improve reception and allow use of the secondary radio for scanning of channels. (As used herein, dwell time refers to a portion of time that a radio is available to receive signals.)

(3) For primary and secondary radios on channels in the upper sub-band: Combination of (1) and (2), including migrating the BSS from the primary radio to the secondary radio, enabling use of upper-band filter mode for the secondary radio chains and full-band filter mode for the primary radio chains, and increasing the dwell time for the primary radio to improve reception for scanning.

These operations are further illustrated and described in FIGS. 4 and 5A-5D.

Figure 2A:
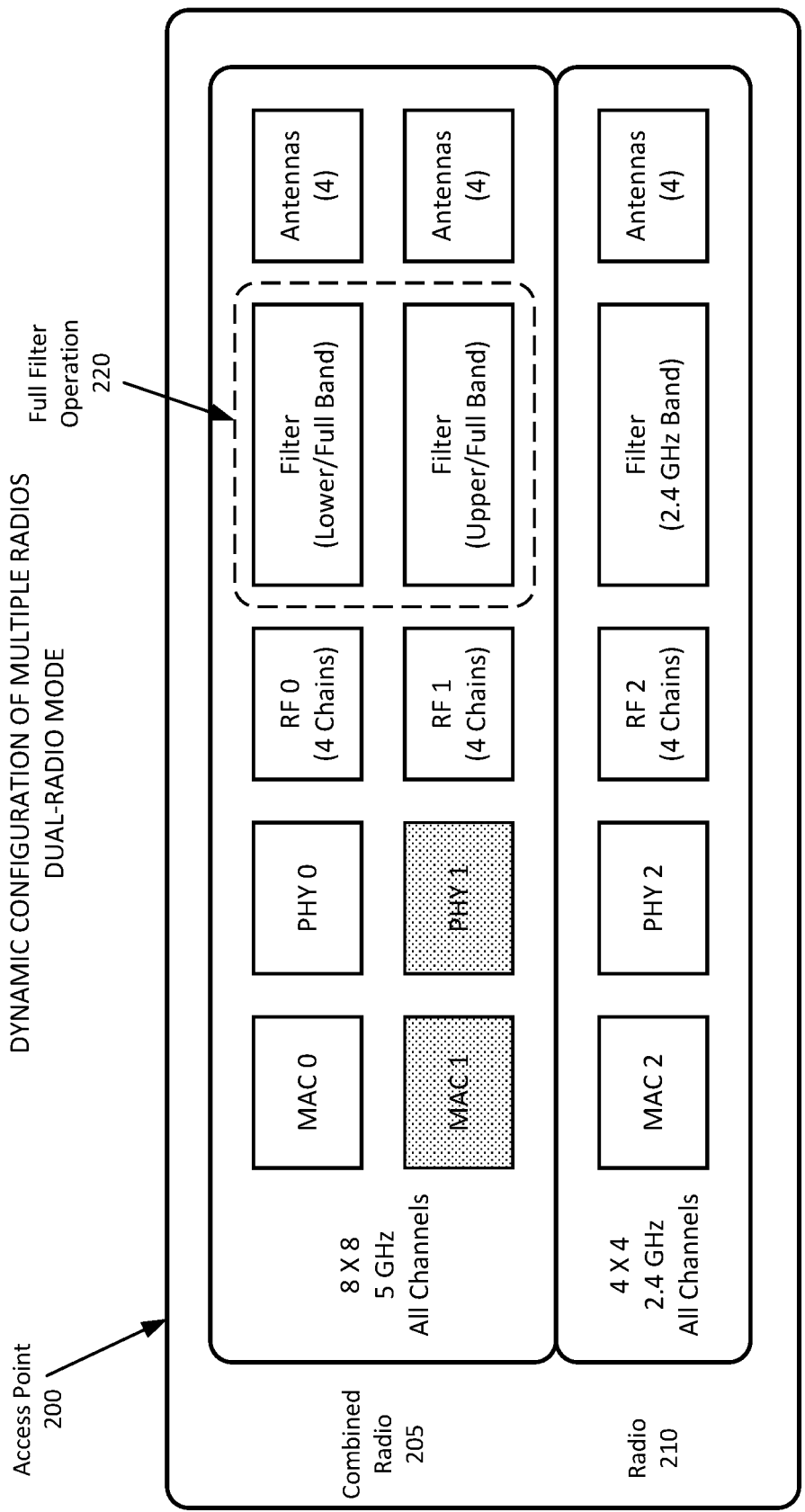
FIGS. 2A and 2B are illustrations of dynamic configuration of multiple radios, according to some embodiments.
Figure 2B:
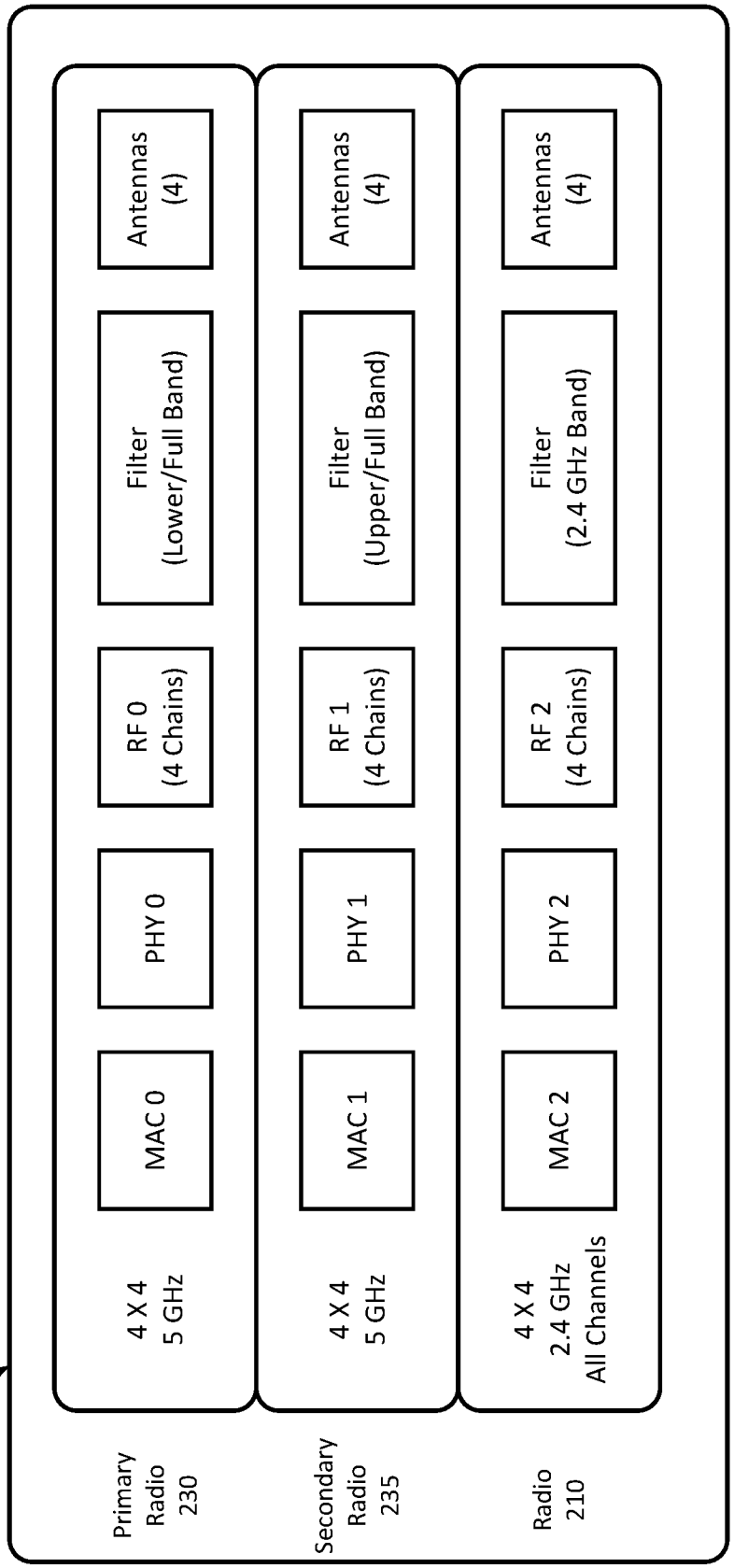

FIGS. 2A and 2B are illustrations of dynamic configuration of multiple radios, according to some embodiments. As shown in FIG. 2A, radios of an access point 200 in a dual-radio mode (a first radio mode) include a combined radio 205 for 5 GHz band operation and a radio 210 for 2.4 GHz operation.

Combined radio 205 is an 8×8 MIMO (Multiple Input Multiple Output) radio including MAC (Media Access Control) 0 and MAC 1, PHY (Physical layer) 0 and PHY 1, RF (Radio Frequency) 0 and RF 1 (each including 4 radio chains), a full hardware filter 220 including a lower/full-band filter and an upper/full-band filter, and two sets of 4 antennas (i.e., 8 antennas for the combined radio). Radio 210 is a 4×4 MIMO radio including MAC 2, PHY 2, RF 2 (including 4 radio chains), a 2.4 GHz band filter 220, and 4 antennas. It is noted that MAC 1 and PHY 1 are shown as being grayed out in FIG. 2A to indicate that these elements (or alternatively MAC 0 and PHY 0) are present but may not be directly used in combined radio operation.

As shown in FIG. 2B, radios of the access point 200 in a tri-radio mode (a second radio mode) include a primary radio 230 for 5 GHz band operation, a secondary radio 235 for 5 GHz band operation, and the radio 210 for 2.4 GHz operation.

Primary radio 230 is a 4×4 MIMO radio including MAC 0, PHY 0, RF 0 (including 4 radio chains), a limited hardware filter including a lower/full-band filter, and 4 antennas. Secondary radio 235 is a 4×4 MIMO radio including MAC 1, PHY 1, RF 1 (including 4 radio chains), a limited hardware filter including a upper/full-band filter, and 4 antennas. Radio 210 is unchanged, with 4×4 MIMO radio including MAC 2, PHY 2, RF 2 (including 4 radio chains), a 2.4 GHz band filter 220, and 4 antennas.

Thus, in transitioning from the dual-radio mode in FIG. 2A (the first radio mode) to the tri-radio mode in FIG. 2B (the second radio mode), the access point 200 provides the versatility of two independent 5 GHz radios, but with limited hardware filtering to address the interference between the radios. In some embodiments, the access point includes capability to reconfigure the primary and secondary radios and utilize the hardware filters to improve operation of the radios. In particular, the access point 200 is to avoid radio configurations in which the primary and secondary radios generate excessive interference in operation, and thus would be unable to practically operate both radios in the 5 GHz band.

Figure 3A:
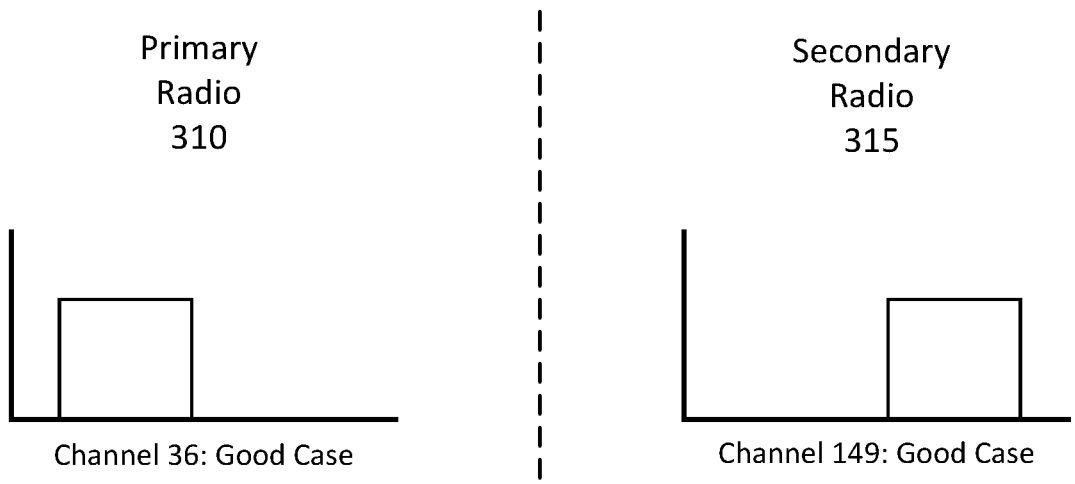
FIGS. 3A and 3B illustrate primary and secondary radio operation in an access point, according to some embodiments.
Figure 3B:
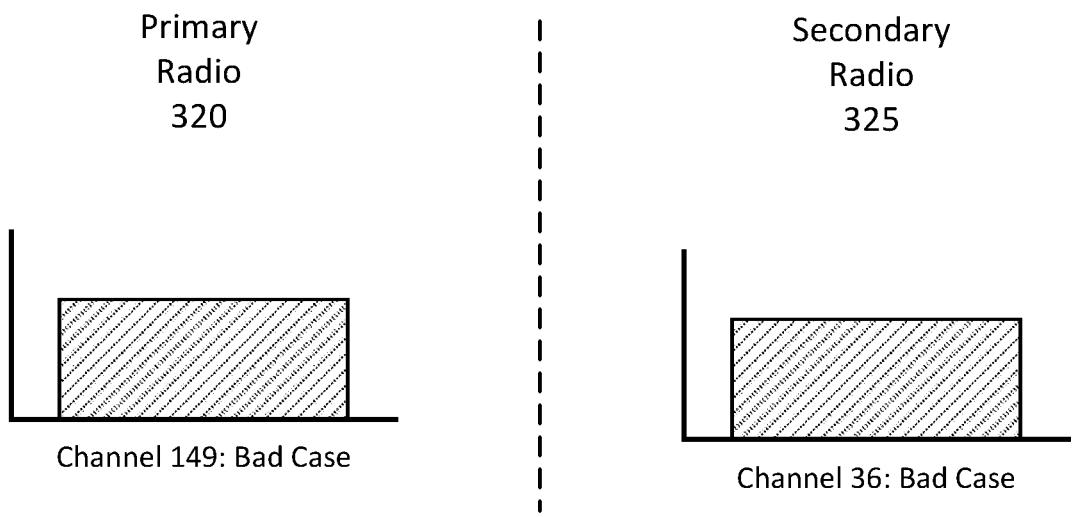

FIGS. 3A and 3B illustrate primary and secondary radio operation in an access point, according to some embodiments. An access point may include a radio mode in which a first radio (primary radio) and a second radio (secondary radio) operate in a same frequency band, such as the access point 200 in FIG. 2B configured to include primary radio 230 and secondary radio 235 in the Wi-Fi 5 GHz band.

As illustrated in FIG. 3A, operating the primary radio 310 on Wi-Fi 5 GHz channel 36 and the secondary radio 315 on Wi-Fi 5 GHz channel 149 provides a good case operation because the transmissions of the primary and secondary radios are in separate (lower and upper) sub-bands, and because the channel frequencies are compatible with the lower-band filter of the primary radio 310 and the upper-band filter of the secondary radio 315. (It is noted that the channel numbers provided in FIGS. 3A and 3B, as well as the channel numbers provided in the other figures, are merely examples, and embodiments are not limited to any particular channels or combinations of channels.) This avoids the use of a full-band filter for either the primary radio 310 or the secondary radio 315, allowing for effective complementary and non-overlapping use of both radios without excessive interference.

However, the best case channel assignment may not be possible in a particular implementation because the prior operation of the radios in the access point and the channel usage of neighboring access points. In one example, as illustrated in FIG. 3B, operating the primary radio 320 on Wi-Fi 5 GHz channel 149 (as, for example, the channel supporting a BSS prior to transitioning to the tri-radio mode) and the secondary radio 325 on Wi-Fi 5 GHz channel 36 (i.e., the reverse channel case from FIG. 3A) provides a bad case operation because, although the transmissions of the primary and secondary radios are in separate (upper and lower) sub-bands, the reversed channel frequencies are incompatible with use of the lower-band filter of the primary radio 320 or the upper-band filter of the secondary radio 325. Even though both lower and upper sub-band filters must be switched to full-band filters to achieve passband compatibility, the resulting interference between both sub-bands due to overlapping filter range will severely limit the operation on both radios.

In some embodiments, the access point including the primary radio and secondary radio provides for dynamic configuration of the multiple radios, including operations as illustrated in FIG. 4.

FIG. 4 is an illustration of multiple radio adaptation cases for access point operations, according to some embodiments. FIGS. 5A to 5D are illustrations of signal operations for radio adaptation cases, according to some embodiments. In some embodiments, an access point supporting multiple radios, including splitting of a radio operating in a radio band into a first (primary) radio and a second (secondary) radio operating in the frequency band, is to provide dynamic adaption of the multiple radios to mitigate interference cases. The radios have limited hardware filtering, including the first radio being limited to a first sub-band filter (a lower-band filter) and a full-band filter and the second radio being limited to a second sub-band filter (an upper-band filter) and a full-band filter.

The adaptions provided by the access point may include, but are not limited to the following four cases:

Case 1 (410)—In this case the primary radio is servicing a BSS on a channel in the lower sub-band (such as channel 36) and switches to operation with the secondary radio on a channel in the upper sub-band (such as channel 149). The resulting condition allows simultaneous transmission and/or reception on both channels, with this channel arrangement providing a best case scenario. As illustrated in FIG. 5A, no mitigation operation is required, and the primary radio and secondary radios may both operate effectively, each utilizing the sub-band filter (the lower-band filter for the primary radio and the upper-band filter for the secondary radio) effectively in complementary fashion to reduce interference. The primary radio thus can continue to service the BSS and the secondary radio can service another BSS or perform another function.

Case 2 (420)—In this case the primary radio is servicing a BSS on a channel in the upper sub-band (such as 149) and switches to operation in which the secondary radio is on a channel in the lower sub-band (such as channel 36). The resulting condition results in transmission on one channel causing interference on the other channel. To apply filtering to the primary and secondary radios it would be necessary to apply the full hardware filtering for the primary radio and the secondary radio as the available sub-band filters (the lower-band filter for the primary radio and the upper-band filter for the secondary radio) are not compatible with the channel assignment. Even though both lower and upper sub-band filters must be switched to full-band filters to achieve passband compatibility, the resulting interference between both sub-bands due to overlapping filter range will severely limit the operation on both radios.

However, this channel assignment is the reverse of case 1. In some embodiments, the access point is to mitigate the interference by migrating the BSS served by the primary radio (moving data structures, re-setting channels, and re-routing frames) from the primary radio to the secondary radio. Upon migrating the BSS operation, the primary radio is on the channel in the lower sub-band (channel 36 in this example) and the secondary radio is on the channel in the upper sub-band (channel 149 in this example). As illustrated in FIG. 5B, after migration of operations the primary radio and secondary radios may both operate effectively, and each utilizing the sub-band filter (the lower-band filter for the primary radio and the upper-band filter for the secondary radio) to reduce interference. The secondary radio is to service the BSS and the primary radio can service another BSS or perform another function.

Case 3 (430)—In this case the primary radio is servicing a BSS on a channel in the lower sub-band (such as channel 36) and switches to operation with the secondary radio also on a channel in the lower sub-band (such as channel 52). The resulting condition results in transmission on one channel causing interference on the other channel. The channel selection allows continued use of primary channel with the use of the lower-band filter, but requires the use of the full-band filter on the secondary radio, which reduces the reception and possible uses of the secondary radio.

Figure 5C:
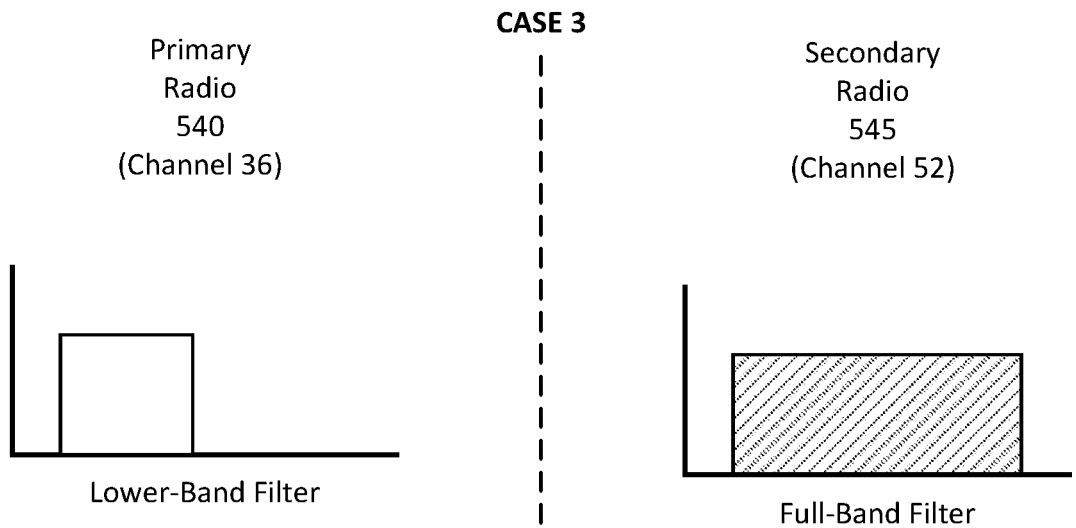

In some embodiments, the access point is to provide mitigation by increasing the dwell time for the secondary radio, improving the capability of such radio to receive signals by increasing the period of time during which a signal can be detected, and thus improving the probability of scanning the neighboring devices. As illustrated in FIG. 5C, the primary radio can continue servicing the BSS and upon increasing the dwell time for the secondary radio, the secondary radio may be utilized for scanning purposes.

Case 4 (440)—In this case the primary radio is servicing a BSS on a channel in the upper sub-band (such as channel 100) and switches to operation with the secondary radio also operating on a channel in the upper sub-band (such as channel 149). The resulting condition results in transmission on one channel causing interference on the other channel. Further, the channel selection requires use of the full-band filter on the primary channel, thus reducing the effectiveness of the primary radio, but allows use of the secondary radio with the upper-band filter.

Figure 5D:
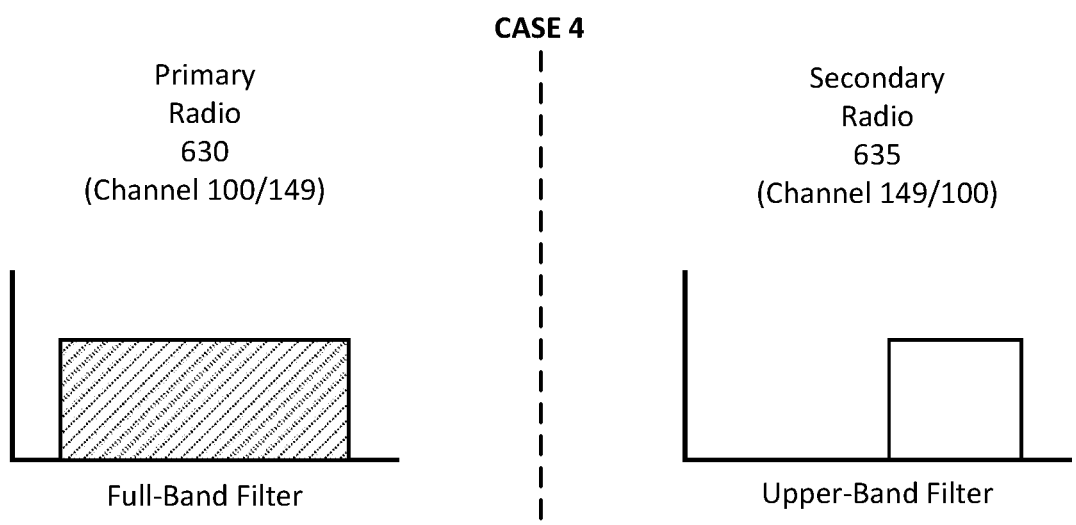

In some embodiments, the access point is to mitigate the interference with a combination of the operations for Case 2 and Case 3, by migrating the BSS served by the primary radio (moving data structures, re-setting channels, and re-routing frames) from the primary radio to the secondary radio, and by increasing the dwell time for the primary radio, thus improving the capability of such radio to receive signals. As illustrated in FIG. 5D, after migration of the BSS the secondary radio is to service the BSS, and, upon increasing the dwell time for the primary radio, the primary radio may be utilized for scanning purposes.

Figure 6A:
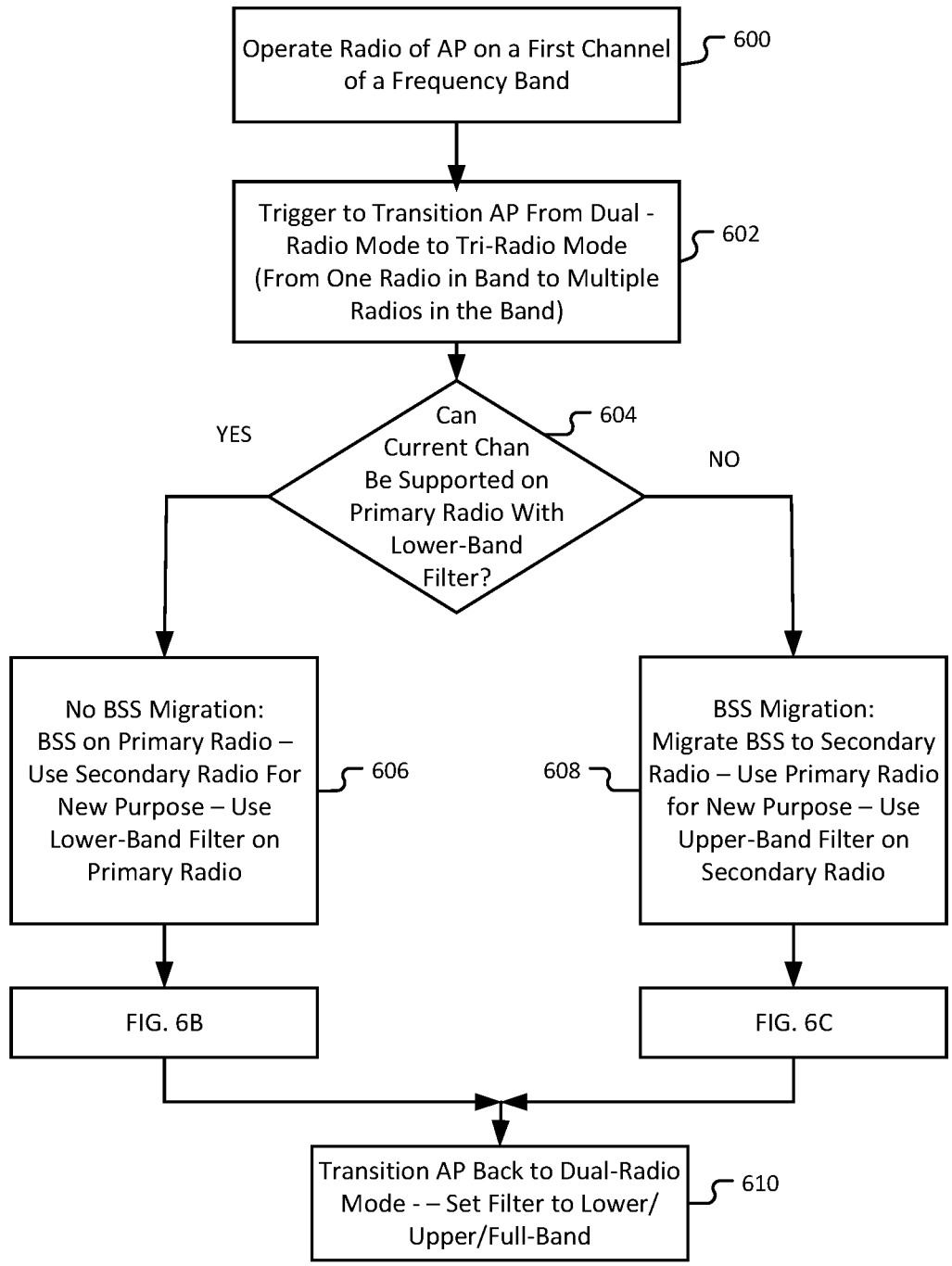
FIGS. 6A to 6C provide a flow chart to illustrate operations for dynamic configuration of multiple radios, according to some embodiments.
Figure 6B:
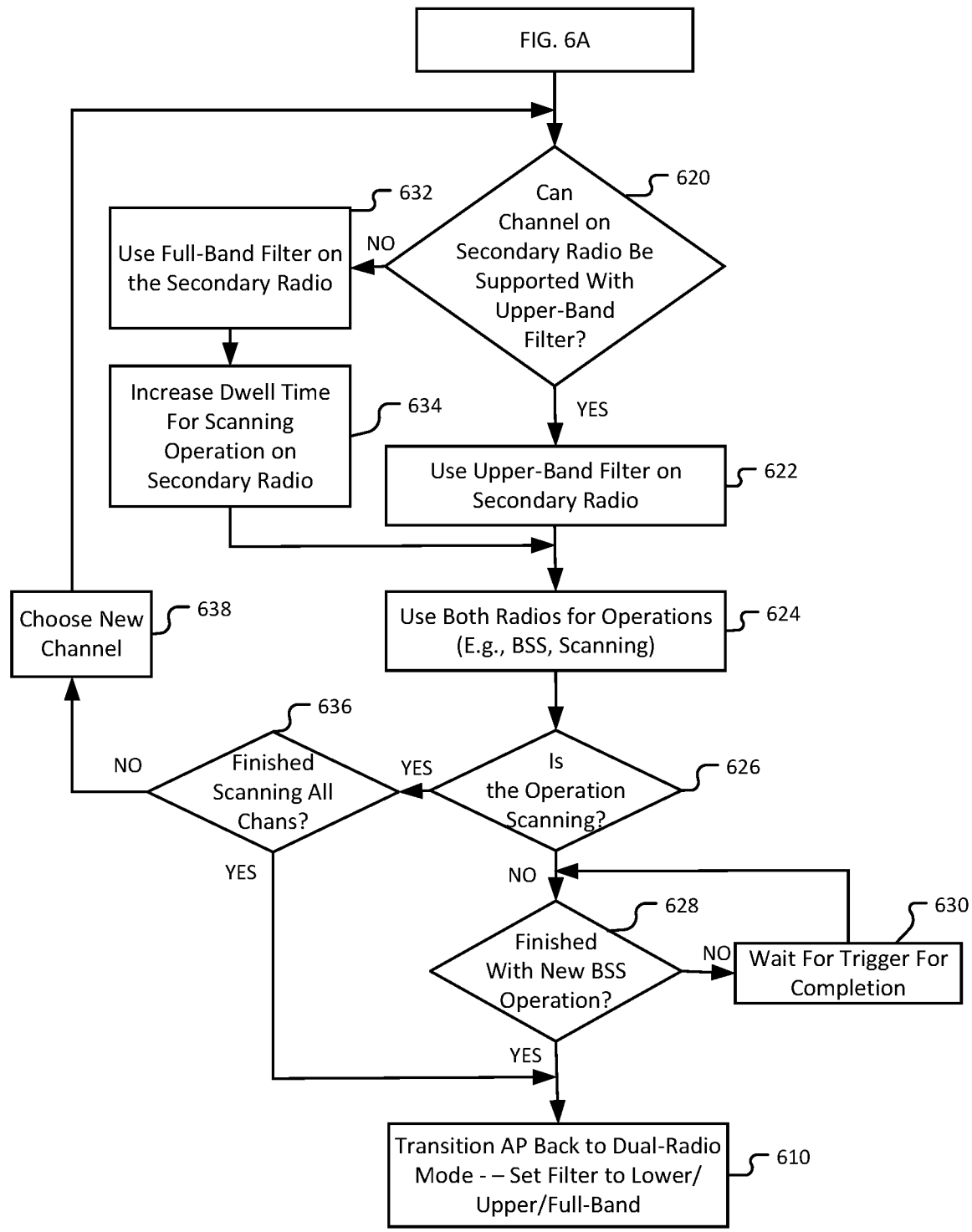
Figure 6C:
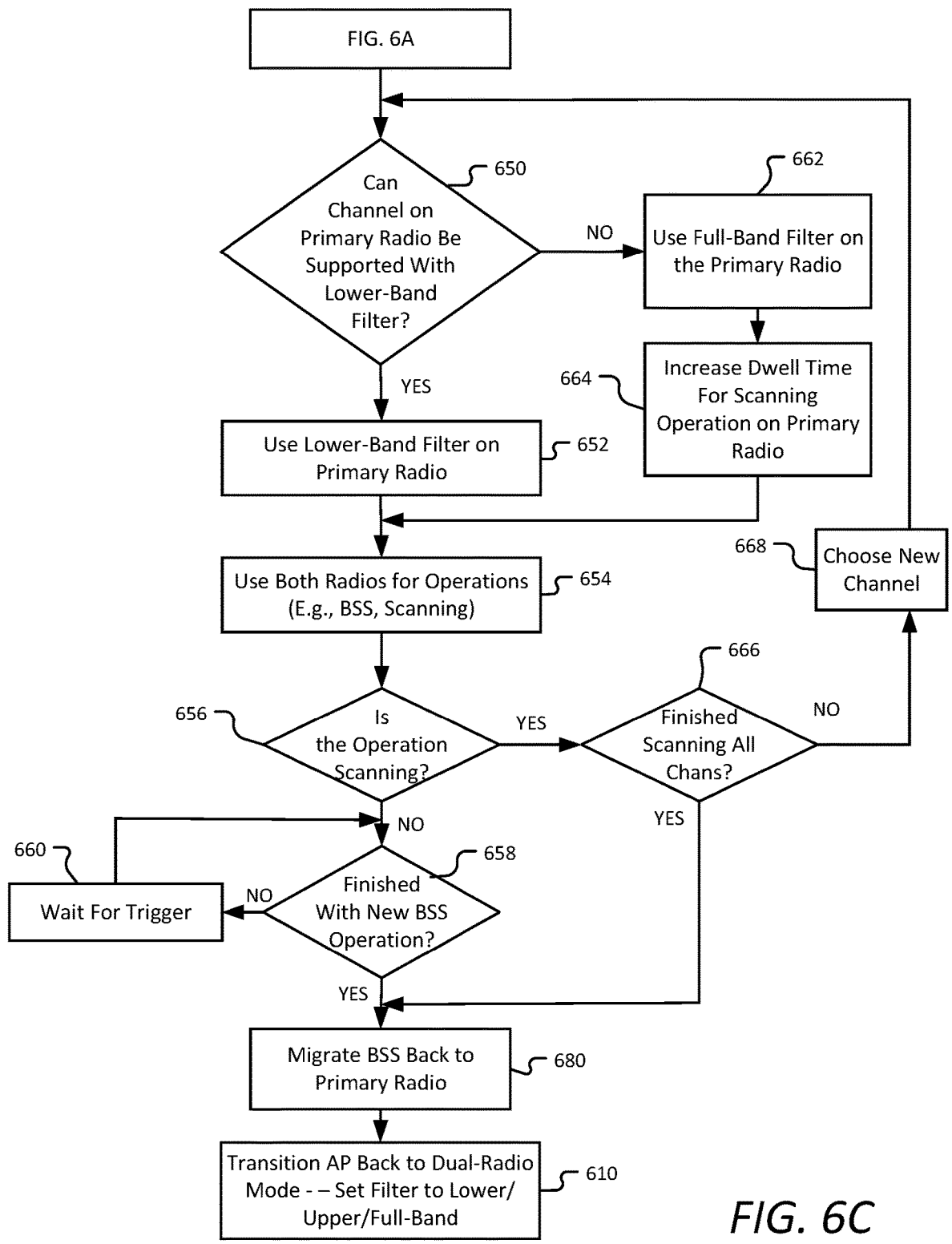

FIGS. 6A to 6C provide a flow chart to illustrate operations for dynamic configuration of multiple radios, according to some embodiments. As shown in FIG. 6A, a process may include operating a radio of an AP, such as access point 200, on a first channel of a frequency band (such as 5 GHz Wi-Fi) 600. The AP may include, but is not limited to, an AP that is operable to transition from a dual-radio mode (2.4 GHz and 5 GHz radios) to a tri-radio mode (2.4 GHz, 5 GHz, and 5 GHz radios), and the 5 GHz radio may be servicing a BSS. The AP includes a sub-band and full-band filter for each of the primary radio and secondary radio, such as the primary radio including a lower-band filter and the secondary radio including an upper-band filter.

In some embodiments, upon receiving a trigger to transition the AP from the dual-radio mode to the tri-radio mode 602 (or from a single-radio mode to a dual-radio mode) to transform the radio on the first channel to multiple radios (including a primary radio and secondary radio) in the frequency band, there is a determination whether the current channel can be supported by the primary radio using the sub-band (lower-band, for example) hardware filter (i.e., wherein the lower-band filter is compatible with the channel assignment). If the current channel can be supported by the primary radio using the lower-band hardware filter, then there is no requirement for BSS migration from the primary radio to the secondary radio, with the primary radio (utilizing the lower-band filter for the primary radio) to service the BSS and the secondary radio to be used for another purpose 606. The process then continues as illustrated in FIG. 6B, and, after completing the tri-radio operations, the AP is transitioned back to the dual-radio mode and the hardware filter is set back to lower/upper/full-band for the 5 GHz radio 610.

If the current channel cannot be supported by the primary radio using the lower-band hardware filter 604, the BSS is migrated from the primary radio to the secondary radio, with the secondary radio (utilizing the upper-band filter for the secondary radio) to service the BSS and the primary radio to be used for another purpose 608. The process then continues as illustrated in FIG. 6C, and, after completing the tri-radio operations and the original BSS being migrated back to the primary radio (pursuant to element 680 illustrated in FIG. 6C), the AP is transitioned back to the dual-radio mode and the hardware filter is set back to lower/upper/full-band for the 5 GHz radio 610.

As shown in FIG. 6B, there is a determination whether the channel on the secondary radio can be supported with the upper-band filter 620. If the channel on the secondary radio can be supported, then the upper-band filter is enabled on the secondary radio 622. If the channel on the secondary radio cannot be supported, then the full-band filter is used on the secondary radio 632, and the dwell time is increased to perform a scanning operation on the secondary radio 634. Both radios then may be used in operations, such as BSS servicing and scanning operation 624.

In some embodiments, if one of the operations is scanning 626, and the scanning operation has not finished scanning all channels to be scanned on the frequency band 636, then a new channel is chosen 638, and the process returns to determining if the channel can be supported on the secondary radio with the upper-band filter 620. If the scanning operation has finished scanning all channels 636, then the process proceeds with AP being transitioned back to the dual-radio mode and the hardware filter is set back to lower/upper/full-band for the 5 GHz radio 610.

If none of the operations is scanning 626, then there is a determination whether the process is completed with the new BSS operation for the secondary radio 628. If not, process waits for a trigger 630 for such determination. When the process is completed for the new BSS operation 628, then the process proceeds with AP being transitioned back to the dual-radio mode with the hardware filter being set back to lower/upper/full-band operation for the 5 GHz radio 610.

As shown in FIG. 6C, there is a determination whether the channel on the primary radio can be supported with the lower-band filter 650. If the channel on the primary radio can be supported, then the lower-band filter is enabled on the primary radio 652. If the channel on the primary radio cannot be supported, then the full-band filter is used on the primary radio 662, and the dwell time is increased to perform a scanning operation on the primary radio 664. Both radios then may be used for operations, such as BSS servicing and scanning operation 654.

In some embodiments, if one of the operations is scanning 656, and the scanning operation has not finished scanning all channels to be scanned on the frequency band 666, then a new channel is chosen 668, and the process returns to determining if the channel can be supported on the primary radio with the lower-band filter 650. If the scanning operation has finished scanning all channels 666, then the process proceeds with AP being transitioned back to the dual-radio mode and the hardware filter is set back to lower/upper/full-band for the 5 GHz radio 610.

If none of the operations is scanning 656, then there is determination whether the process is completed with the new BSS operation for the primary radio 658. If not, process waits for a trigger 660 for such determination. When the process is completed for the new BSS operation 658, then the process proceeds with the original BSS being migrated back to the primary radio 680, and the AP being transitioned back to the dual-radio mode with the hardware filter being set back to lower/upper/full-band operation for the 5 GHz radio 610.

FIG. 7 is an illustration of an access point including dynamic configuration of multiple radios, according to some embodiments. The access point 700 includes multiple radio chains 735 and antennas (such as the multiple radio chains and antennas illustrated for an access point in FIGS. 1, 2A, and 2B) for wireless signal communication, and one or more ports 745 for network connections or other connections. The multiple radio chains include capability for transitioning between a first radio mode including at least one radio operating in a radio band, and a second radio mode operating multiple radios in the radio band.

The radio modes may include, but are not limited to, a dual-radio mode and a tri-radio mode, as illustrated in FIGS. 1, 2A, and 2B. In an example, the access point 700 may include a dual-radio mode in which a 2.4 GHz radio is associated with a first set of stations, such as devices 750 and 755, in a first BSS and a 5 GHz radio is associated with a second set of stations, such as devices 760 and 765, in a second BSS. The access point 700 may further the capability of transitioning to a tri-radio mode in which the 2.4 GHz radio is associated with the first BSS, a first (primary) 5 GHz radio is associated with the second BSS, and a second (secondary) 5 GHz radio provides another function, such as being associated with a third BSS (such as including devices 770 and 775) or providing scanning operations to scan channels in the frequency band.

The access point 700 further includes a processing unit 705 for processing of data; memory and registers 710 for storage of data, which may include volatile and nonvolatile memory (including flash memory and similar elements), registers, and other storage technologies; and power control 715. The access point further includes hardware filters 720 for the operation of the multiple radios, the hardware filters being a set of hardware filters with limited capabilities for cost and size such that multiple radios are not allocated all possible filters. In a particular example, a first radio may have access to a first sub-band filter (such as a lower-band filter) and a full-band filter, and a second radio may have access to a second sub-band filter (such as an upper-band filter) and a full-band filter.

In some embodiments, the access point 700 includes capability for dynamic configuration of the multiple radios to mitigate interference between radios operating in a frequency band. In some embodiments, the access point 700 further includes firmware or hardware 730 that includes support for multiple radio modes 732, such as transitioning between a first radio mode and a second radio mode by modifying the operation of the radio chains 735 and antennas 740; and support for dynamic multiple radio configuration 734 to mitigate interference between multiple radios operating in a frequency band. In some embodiments, the operations to mitigate interference include the operations to address the cases illustrated in FIGS. 4 and 5A-5D, and the process for dynamic configuration of multiple radios may be as illustrated in FIGS. 6A to 6C.

FIG. 8 is an illustration of intelligent channel allocation for access points, according to some embodiments. In addition to the operations illustrated in FIGS. 1-7 for dynamic configuration of multiple radios of an access point, the operation of multiple radios may be further enhanced if multiple access points in an extended service set (ESS) are steered to be assigned channels such that at any point there is a preference for cases 1 and 2 as illustrated in FIG. 4.

In some embodiments, an algorithm is run at an ESS-level to identify the channels allocated to the APs in the network. In some embodiments, the algorithm is to perform channel allocation to provide or prefer a uniform spatial distribution of channels from both lower and upper sub-bands amongst the APs.

In some embodiments, if at a point an AP needs to transition into a dual-5 GHz mode for BSS operations, the algorithm is to allocate the new channel from the sub-band to which the current channel does not belong. This operation would thus provide a best isolation between the two 5 GHz MACs.

For example, FIG. 8 includes illustration of APs in a single-5 GHz mode 800 in which the APs are staggered such that an AP with a radio channel in one sub-band is adjacent to APs with radio channels in the other sub-band. While such allocation may not be possible in all cases, a preference to such allocation will improve the likelihood of good results for multiple radio operation. FIG. 8 further illustrates second radios for APs in dual-GHz mode 850. As shown, the staggering of allocations of the channels in upper and lower sub-bands generally enables the allocation of a channel in the opposite sub-band when transitioning to the dual-5 GHz mode.

In some embodiments, for scanning operations, instead of allocating all channels to be scanned to a particular AP, the algorithm is to select a pair of co-located APs whose home-channel for the BSS each belongs to dissimilar sub-bands. For example, a first AP with may support a BSS on channel 36 and a second AP may support a BSS on channel 149. In this instance, the first AP with BSS on the lower sub-band will be given a scan-list of channels from the upper sub-band, and the second AP with BSS on the upper sub-band will be given a scan-list of channels from the lower sub-band. This operation thus supports prominence of cases 1 and 2 in the network, and hence most optimal performance for scanning. When channel allocation to provide such cases is not feasible, the other cases can still be optimized as best possible under the circumstances.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, an access point includes a processor; a memory for storage of data; hardware filters for radio operation; and a first set of radio chains and antennas for operation on a frequency band, wherein the access point includes at least a first radio mode for operation of the first set of radio chains and antennas as a single radio on a first channel to service a first basic service set (BSS), and a second radio mode for operation of the first set of radio chains and antennas as a first radio on the first channel to service the first BSS and a second radio on a second channel to perform an additional service, the first radio having a first hardware filter set and the second radio including a second hardware filter set; and wherein the access point is to provide dynamic configuration of the first radio and second radio to mitigate interference, the dynamic configuration including upon determining that operation of the first channel to service the first BSS is not compatible with the first hardware filter set of the first radio migrating the first BSS from the first radio to the second radio to be serviced by the second radio on the second channel, and providing the additional service by the first radio on the first channel.

In some embodiments, one or more non-transitory computer-readable storage mediums have stored thereon executable computer program instructions that, when executed by one or more processors, cause the one or more processors to perform operations including operating an access point including at least a radio on a first frequency band, the radio to operate on a first channel of the first band to service a first basic service set (BSS); splitting the radio on the first frequency band into a first radio and a second radio, the first radio to operate on the first channel to service the first BSS and the second radio to operate on a second channel of the first band to perform an additional service, the first radio including a first hardware filter set and the second radio including a second hardware filter set; and upon determining that operation of the first channel to service the first BSS is not compatible with the first hardware filter set of the first radio, migrating the first BSS from the first radio to the second radio to be serviced by the second radio on the second channel, and providing the additional service by the first radio on the first channel.

In some embodiments, a method includes operating an access point including at least a radio on a first frequency band in a first radio mode, the radio to operate on a first channel of the first band to service a first basic service set (BSS); transitioning the access point to a second radio mode including splitting the radio on the first frequency band into a first radio and a second radio, the first radio to operate on the first channel to service the first BSS and the second radio to operate on a second channel of the first band to perform an additional service, the first radio including a first hardware filter set and the second radio including a second hardware filter set; and upon determining that operation of the first channel to service the first BSS is not compatible with the first hardware filter set of the first radio, migrating the first BSS from the first radio to the second radio to be serviced by the second radio on the second channel, and providing the additional service by the first radio on the first channel.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An access point comprising:
a processor;
a memory for storage of data;
hardware filters for radio operation; and
a first set of radio chains and antennas for operation on a frequency band, wherein the access point includes at least a first radio mode for operation of the first set of radio chains and antennas as a single radio on a first channel to service a first basic service set (BSS), and a second radio mode for operation of the first set of radio chains and antennas as a first radio on the first channel to service the first BSS and a second radio on a second channel to perform an additional service, the first radio having a first hardware filter set and the second radio including a second hardware filter set, wherein the first hardware filter set includes a lower-band filter and a full-band filter and the second hardware filter set includes an upper-band filter and a full-band filter; and
wherein the access point is to provide dynamic configuration of the first radio and second radio to mitigate interference, the dynamic configuration including:
in response to the first radio and the second radio on channels in an upper sub-band of the frequency band, migrating the BSS from the first radio to the second radio, and operating the upper-band filter of the second radio and the full-band filter of the first radio, and increasing a dwell time for the first radio to perform the additional service, comprising a scanning service on the first radio;
in response to the first radio on a channel in the upper sub-band and the second radio on a channel in a lower sub-band of the frequency band, migrating the BSS from the first radio to the second radio, and operating the lower-band filter of the first radio and the upper-band filter of the second radio; and
in response to the first radio and the second radio on channels in the lower sub-band, increasing a dwell time for the second radio to perform the additional service comprising a scanning service on the second radio.

2. The access point of claim 1, further including a second set of radio chains and antennas for operation on a second frequency band.

3. The access point of claim 2, wherein:
the frequency band is a 5 GHz frequency band and the second frequency band is a 2.4 GHz frequency band; or
the frequency band encompasses 5 and 6 GHz frequency bands (UNII-1 to UNII-8) treated as a contiguous band and the second frequency band is a 2.4 GHz frequency band, wherein frequency sub-bands in a larger contiguous 5 to 7 GHz frequency range (UNII-1 to UNII-8) may be divided into any number of non-overlapping sections with filtering appropriate to each sub-band.

4. One or more non-transitory computer-readable storage mediums having stored thereon executable computer program instructions that, when executed by one or more processors, cause the one or more processors to perform operations comprising:
operating an access point including at least a radio on a first frequency band, the radio to operate on a first channel of the first band to service a first basic service set (BSS);
splitting the radio on the first frequency band into a first radio and a second radio, the first radio to operate on the first channel to service the first BSS and the second radio to operate on a second channel of the first band to perform an additional service, the first radio including a first hardware filter set and the second radio including a second hardware filter set, wherein the first hardware filter set includes a lower-band filter and a full-band filter and the second hardware filter set includes an upper-band filter and a full-band filter;
in response to the first channel and second channel located in an upper sub-band of the first frequency band, migrating the BSS from the first radio to the second radio, and operating the upper-band filter of the second radio and the full-band filter of the first radio, and increasing a dwell time for the first radio to perform the additional service comprising a scanning service on the first radio;
in response to the first channel located in the upper sub-band and the second channel located in a lower sub-band of the first frequency band, migrating the BSS from the first radio to the second radio, and operating the lower-band filter of the first radio and the upper-band filter of the second radio; and
in response to the first channel and the second channel located in the lower sub-band, increasing a dwell time for the second radio to perform the additional service comprising a scanning service on the second radio.

5. The one or more non-transitory computer-readable storage mediums of claim 4, wherein the first radio is a primary radio and the second radio is a secondary radio.

6. A method comprising:
operating an access point including at least a radio on a first frequency band in a first radio mode, the radio to operate on a first channel of the first band to service a first basic service set (BSS);
transitioning the access point to a second radio mode including splitting the radio on the first frequency band into a first radio and a second radio, the first radio to operate on the first channel to service the first BSS and the second radio to operate on a second channel of the first band to perform an additional service, the first radio including a first hardware filter set and the second radio including a second hardware filter set, wherein the first hardware filter set includes a lower-band filter and a full-band filter and the second hardware filter set includes an upper-band filter and a full-band filter;
in response to the first channel and second channel located in an upper sub-band of the first frequency band, migrating the BSS from the first radio to the second radio, and operating the upper-band filter of the second radio and the full-band filter of the first radio, and increasing a dwell time for the first radio to perform the additional service comprising a scanning service on the first radio;
in response to the first channel located in the upper sub-band and the second channel located in a lower sub-band of the first frequency band, migrating the BSS from the first radio to the second radio, and operating the lower-band filter of the first radio and the upper-band filter of the second radio; and
in response to the first channel and the second channel located in the lower sub-band, increasing a dwell time for the second radio to perform the additional service comprising a scanning service on the second radio.

7. The method of claim 6, wherein the first channel is selected pursuant to an algorithm of an extended service set (ESS) including the access point, the algorithm to stagger channels between the upper sub-band of the first frequency band and the lower sub-band of the first frequency band.

8. The method of claim 7, wherein when the first channel is in the upper sub-band and the second channel is in the lower sub-band, the additional service including scanning a first set of channels in either the upper sub-band or the lower sub-band, wherein a second set of channels in the other of the upper sub-band or lower sub-band is to be scanned by a second access point.

* * * * *